UNITED STATES PATENT OFFICE.

JOHN W. BROWN, OF LAKEWOOD, OHIO, ASSIGNOR TO NATIONAL CARBON COMPANY, OF CLEVELAND, OHIO, A CORPORATION OF NEW JERSEY.

DRY CELL.

1,184,818.  Specification of Letters Patent.  Patented May 30, 1916.

No Drawing.   Application filed December 1, 1911.  Serial No. 663,419.

*To all whom it may concern:*

Be it known that I, JOHN W. BROWN, a citizen of the United States, residing at Lakewood, in the county of Cuyahoga and State of Ohio, have invented a certain new and useful Improvement in Dry Cells, of which the following is a full, clear, and exact description.

This invention relates to dry cells, and more particularly to the mixture of materials forming the active material within the cell.

Generally speaking, the invention comprises the elements and combinations thereof set forth in the accompanying claims.

The usual filling mixture for dry batteries in addition to the usual elements incorporated to produce the electro-chemical action, contains coke carbon and graphite, which latter elements produce certain advantageous results by their use, principally by increasing the current output of the cell. I have found, however, that superbaked carbon may be used in a battery mixture in place of the graphite and coke carbon, retaining all the advantages flowing from the use of graphite and coke carbon, and at the same time eliminating the objectionable features which are inherent in the use of graphite and coke carbon.

The superbaked carbon is incorporated in the battery mixture in a finely divided condition, or in the form of flour, and while the quantity of superbaked carbon thus used is not absolutely fixed, I have found that when incorporated to form about 25 per cent. of the battery mixture, very satisfactory results are obtained. Preferably, petroleum coke is used as the basis for the superbaked carbon. This coke is heated in any suitable manner to a temperature above that to which carbon products are usually heated to drive off their volatile constituents, and below that temperature at which carbon will graphitize by the direct application of heat. These limiting temperatures are approximately 1400° to 2200° centigrade. Therefore, carbon baked to a temperature lying between these limits I term superbaked carbon.

The graphite which is at present used in the filler or mixture for the batteries may be either a natural graphite or an artificial graphite, and in the latter case Acheson graphite is the usual product used. But, in the use of either of these forms of graphite, there are certain inherent objections which are overcome by the use of the superbaked carbon.

The percentage of ash in a natural or Acheson graphite is high, being in the neighborhood of ten per cent. as against an ash of about one per cent. in superbaked petroleum coke. This large percentage of ash in the graphite is objectionable, because it represents just so much non-active or inert material in the cell mixture which displaces active material, and by so much reduces the efficiency of the cell. Moreover, it is well known that iron oxid occurs as an impurity in both the natural and Acheson graphites, and in the case of the Acheson graphite, it is a fact that the iron partially, at least, remains in the metallic form, as an impurity in the graphite. The presence of the iron in a battery mixture has a marked adverse effect upon the life or length of service of the cell. The superbaked carbon is low in ash and contains substantially no iron. The superiority therefore for the use herein disclosed must be apparent.

The superbaked carbon may be produced as a substantially homogeneous and uniform product, and therefore the use of this material enables the manufacture of a more uniform grade of cells than can be accomplished in using graphite and coke carbon, for with these latter materials it is almost impossible to obtain a mixture of these substances which is uniform and homogeneous, and in practice this result is never obtained.

From the uniformity and homogeneity of the superbaked carbon it follows that the electro-chemical action within the cell is uniform to a much greater extent than is obtained when graphite and coke carbon are used. It has further been found that the shelf life or capacity to withstand deterioration when stored, is greatly increased in those cells in which superbaked carbon is used,—this result largely flowing from the fact that the injurious impurities which graphite always carries are not present in the superbaked carbon.

The cost of manufacture of dry cells is decreased by the use of superbaked carbon, inasmuch as this material is cheaper to produce than is the mixture of graphite and coke carbon, and further the manufacture of batteries is facilitated by the use of a single uniform substance, and one, which, because of its hardness and strength, is easy to pulverize, whereas the soft graphite is quite difficult to mill.

Having described my invention, I claim:

1. A filling mixture for dry cells containing superbaked coke.

2. A filling mixture for dry cells containing superbaked petroleum coke.

3. In a dry cell the combination of a positive electrode, a negative electrode, and a filling mixture containing superbaked coke.

4. In a dry cell, the combination of a positive electrode, a negative electrode, and a filling mixture containing superbaked petroleum coke.

In testimony whereof, I hereunto affix my signature in the presence of two witnesses.

JOHN W. BROWN.

Witnesses:
F. D. LAURENCE,
RICHARD H. HANVEY.